US012576726B2

(12) United States Patent
Zengin et al.

(10) Patent No.: US 12,576,726 B2
(45) Date of Patent: Mar. 17, 2026

(54) ENERGY MANAGEMENT IN HEAVY DUTY TRUCKS USING INEFFICIENT MOTOR OPERATION

(71) Applicant: FCA US LLC, Auburn Hills, MI (US)

(72) Inventors: Nursefa Zengin, Auburn Hills, MI (US); Joseph Falcon, Auburn Hills, MI (US); Diego Fernando Valencia Garcia, Auburn Hills, MI (US); Sezai Osman Oder, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 8 days.

(21) Appl. No.: 18/805,648

(22) Filed: Aug. 15, 2024

(65) Prior Publication Data

US 2026/0048669 A1     Feb. 19, 2026

(51) Int. Cl.
B60L 58/12          (2019.01)
B60L 15/20          (2006.01)

(52) U.S. Cl.
CPC ........... B60L 15/2009 (2013.01); B60L 58/12 (2019.02); *B60L 2240/423* (2013.01)

(58) Field of Classification Search
CPC ................. B60L 15/2009; B60L 58/12; B60L 2240/423; B60L 11/00
See application file for complete search history.

(56) References Cited

U.S. PATENT DOCUMENTS

| | | | |
|---|---|---|---|
| 6,573,675 B2 | 6/2003 | Schmitz et al. | |
| 7,739,005 B1 * | 6/2010 | Tang ....................... | B60L 11/00 |
| 7,847,501 B2 | 12/2010 | Baglino et al. | |
| 8,336,319 B2 | 12/2012 | Johnston et al. | |
| 8,970,147 B2 | 3/2015 | Baglino et al. | |
| 2010/0000713 A1 | 1/2010 | Takahashi et al. | |
| 2010/0090629 A1 | 4/2010 | Tang | |
| 2011/0072841 A1 | 3/2011 | Arai et al. | |

* cited by examiner

*Primary Examiner* — Brodie J Follman
(74) *Attorney, Agent, or Firm* — Jeremy J. Klobucar

(57)          ABSTRACT

An energy management method for a range-extended electrified vehicle (REEV) includes, in response to enablement of an inefficiency mode of the REEV, utilizing inefficient motor loss maps specifically for the inefficiency mode and separate from maximum efficiency motor loss maps, determining motor torque commands for an electric motor of the REEV using a driver torque request, the inefficient motor loss maps, and inefficient motor torque command mappings specifically for the inefficiency mode and separate from maximum efficiency motor torque command mappings, and controlling the electric motor using the determined motor torque commands to generate heat energy and dissipate energy from a battery system of the REEV configured to power the electric motor and thereby create space for storage of energy captured by a regenerative braking system of the REEV.

18 Claims, 3 Drawing Sheets

1

ENERGY MANAGEMENT IN HEAVY DUTY TRUCKS USING INEFFICIENT MOTOR OPERATION

FIELD

The present application generally relates to range-extended electrified vehicles (REEVs) and, more particularly, to energy management in heavy duty trucks using inefficient motor operation.

BACKGROUND

An electrified vehicle (EV) is propulsively powered by an electrified powertrain that includes one or more electric motors powered by electrical energy (i.e., current) from a high voltage battery system. A range-extended EV (REEV) includes another power source (e.g., an internal combustion engine, a fuel cell system, or some combination thereof) that is specifically configured to recharge the high voltage battery system. For heavy-duty EV applications, such as heavy-duty pickup trucks that are capable of towing significant payloads, there is a desire to minimize the usage of conventional friction brakes (e.g., during downhill driving) to extend their life/usability. This is typically achieved by instead utilizing 0erative braking to recapture the vehicle's kinetic energy. In some scenarios, however, the energy storage system is "full" or at its capacity and thus regenerative braking cannot be utilized. Accordingly, while such conventional EV control systems do work well for their intended purpose, there exists an opportunity for improvement in the relevant art.

SUMMARY

According to one example aspect of the invention, an energy management system for a range-extended electrified vehicle (REEV) is presented. In one exemplary implementation, the energy management system comprises a set of sensors configured to monitor a set of operating parameters of the REEV, the set of operating parameters being indicative of (i) a driver torque request and (ii) whether to enable an inefficiency mode for operating an electric motor of the REEV and a control system configured to determine whether to enable the inefficiency mode for operating the electric motor of the REEV based on the set of operating parameters and, in response to enablement of the inefficiency mode, utilize inefficient motor loss maps specifically for the inefficiency mode and separate from maximum efficiency motor loss maps, determine motor torque commands for the electric motor using the driver torque request, the inefficient motor loss maps, and inefficient motor torque command mappings specifically for the inefficiency mode and separate from maximum efficiency motor torque command mappings, and control the electric motor using the determined motor torque commands to generate heat energy and dissipate energy from a battery system configured to power the electric motor and thereby create space for storage of energy captured by a regenerative braking system of the REEV.

In some implementations, the inefficient motor torque commands cause the electric motor to generate a desired amount of drive torque to satisfy the driver torque request at a decreased efficiency. In some implementations, the inefficient motor torque commands are one of a plurality of different inefficient motor torque commands that each cause the electric motor to generate the desired amount of drive torque to satisfy the driver torque request at the same decreased efficiency or at different decreased efficiencies. In some implementations, the set of operating parameters includes at least one of (i) road grade, (ii) state of charge (SOC) of the battery system, and (iii) temperature of a friction brake system of the REEV. In some implementations, the set of operating parameters includes at least (i) the road grade, (ii) SOC of the battery system, and (iii) the temperature of the friction brake system.

In some implementations, the set of operating parameters includes road parameters of a future road segment that the REEV will encounter such that the control system is configured to enable the inefficiency mode for operating the electric motor proactively before the road segment is reached. In some implementations, the set of operating parameters includes an operating parameter of a friction brake system of the REEV, and wherein the inefficiency mode is configured to intentionally dissipate energy from the battery system to reduce a load on the friction brake system. In some implementations, the REEV includes the electric motor and at least one additional electric motor, and wherein the inefficiency mode is for operating at least one of the two or more electric motors. In some implementations, the REEV includes the electric motor and the engine associated with a front axle of the REEV and the at least one additional electric motor associated with a rear axle of the REEV.

According to another example aspect of the invention, an energy management method for an REEV is presented. In one exemplary implementation, the energy management method comprises receiving, by a control system of the REEV and from a set of sensors of the REEV, a set of operating parameters of the REEV, the set of operating parameters being indicative of (i) a driver torque request and (ii) whether to enable an inefficiency mode for operating an electric motor of the REEV, determining, by the control system, whether to enable the inefficiency mode for operating the electric motor of the REEV based on the set of operating parameters, and in response to enablement of the inefficiency mode, utilizing, by the control system, inefficient motor loss maps specifically for the inefficiency mode and separate from maximum efficiency motor loss maps, determining, by the control system, motor torque commands for the electric motor using the driver torque request, the inefficient motor loss maps, and inefficient motor torque command mappings specifically for the inefficiency mode and separate from maximum efficiency motor torque command mappings, and controlling, by the control system, the electric motor using the determined motor torque commands to generate heat energy and dissipate energy from a battery system configured to power the electric motor and thereby create space for storage of energy captured by a regenerative braking system of the REEV.

In some implementations, the inefficient motor torque commands cause the electric motor to generate a desired amount of drive torque to satisfy the driver torque request at a decreased efficiency. In some implementations, the inefficient motor torque commands are one of a plurality of different inefficient motor torque commands that each cause the electric motor to generate the desired amount of drive torque to satisfy the driver torque request at the same decreased efficiency or at different decreased efficiencies. In some implementations, the set of operating parameters includes at least one of (i) road grade, (ii) SOC of the battery system, and (iii) temperature of a friction brake system of the REEV. In some implementations, the set of operating parameters includes at least (i) the road grade, (ii) SOC of the battery system, and (iii) the temperature of the friction brake system.

In some implementations, the set of operating parameters includes road parameters of a future road segment that the REEV will encounter such that the control system is configured to enable the inefficiency mode for operating the electric motor proactively before the road segment is reached. In some implementations, the set of operating parameters includes an operating parameter of a friction brake system of the REEV, and wherein the inefficiency mode is configured to intentionally dissipate energy from the battery system to reduce a load on the friction brake system. In some implementations, the REEV includes the electric motor and at least one additional electric motor, and wherein the inefficiency mode is for operating at least one of the two or more electric motors. In some implementations, the REEV includes the electric motor and the engine associated with a front axle of the REEV and the at least one additional electric motor associated with a rear axle of the REEV.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, for heavy-duty electrified vehicle applications in particular, such as heavy-duty pickup trucks that are capable of towing significant payloads, there is a desire to minimize the usage of conventional friction brakes to extend their life/usability. This is typically achieved by instead utilizing regenerative braking to recapture the vehicle's kinetic energy. In some scenarios, however, the high voltage battery system is "full" or at its capacity and thus regenerative braking cannot be utilized. Adding additional energy storage systems (capacitors, battery systems, etc.) or large resistor banks significantly increases vehicle weight and costs. Accordingly, improved energy management techniques for REEVs are presented herein. These control techniques involve a unique power dissipation control strategy, which is also referred to as electrical burn or "e-burn." This process involves intentionally dissipating energy of the electrified powertrain during certain operating conditions (e.g., downhill operation) in order to increase the availability of regenerative braking and thereby mitigate a thermal load on the conventional friction brakes.

This intentional energy dissipation is achieved by operating the electric motor(s) of the electrified powertrain in an inefficiency mode, thereby increasing their energy consumption. During operation in this inefficiency mode, different motor torque (Id/Iq) mappings are utilized such that the electric motor(s) generate the same amount of torque, but at a decreased efficiency (which is released as heat energy). Activation of this inefficiency mode can be selectively controlled based on current and predicted/future conditions, such as a current state of charge (SOC) of the high voltage battery system and an upcoming extended downhill region (e.g., based on future road segment grade analysis). Potential benefits of these new techniques include increased component (e.g., friction brake system) life/usability and avoiding the increased weight/costs associated with the other conventional solutions to this problem as discussed above (additional storage batteries/capacitors, resistive heat banks, etc.).

Figure 1:
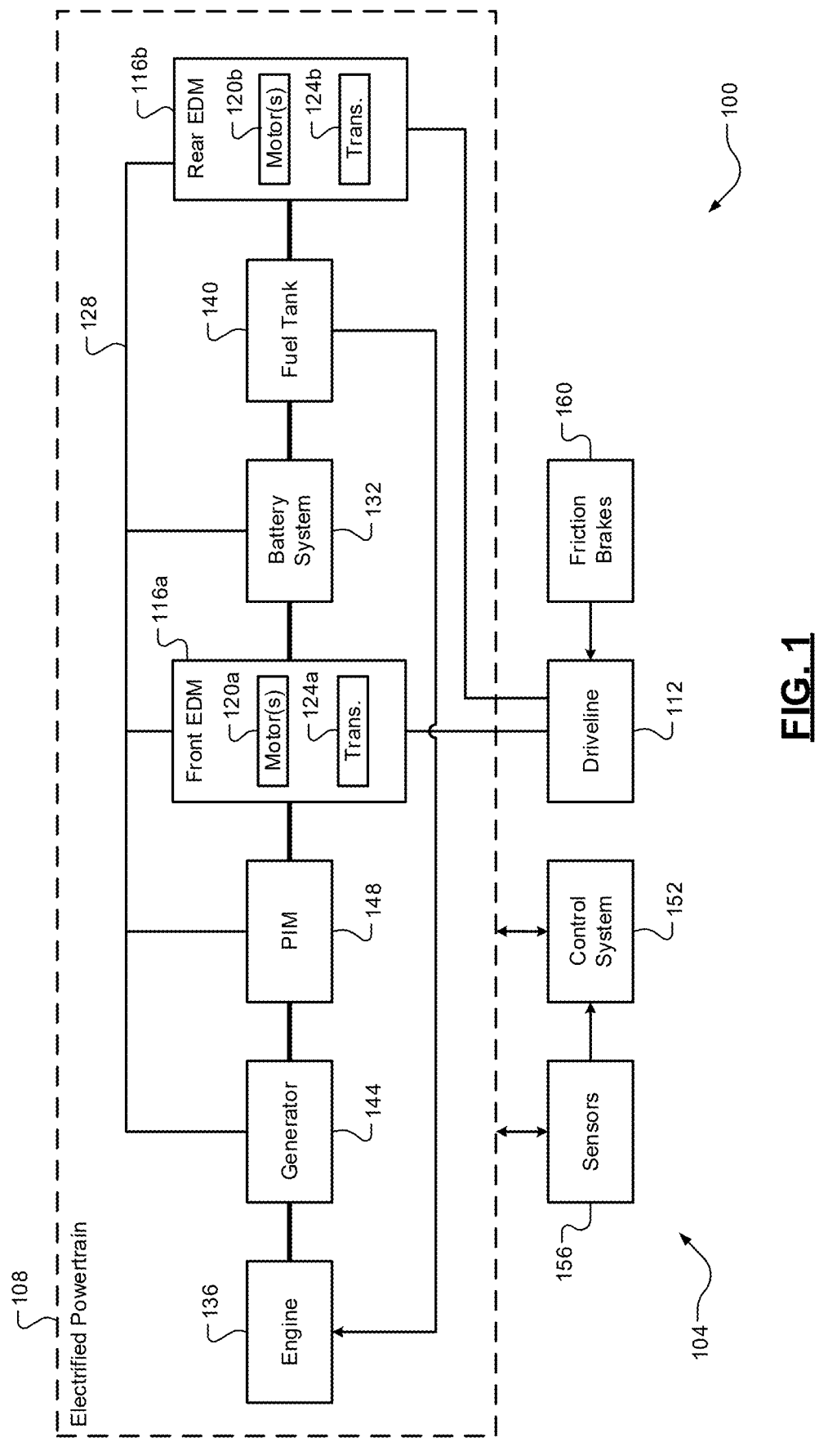
FIG. 1 is a functional block diagram of a range-extended electrified vehicle (REEV) having an example energy management system according to the principles of the present application.

Referring now to FIG. 1, a functional block diagram of an REEV 100 (also referred to herein as "vehicle 100") having an example energy management system 104 according to the principles of the present application is illustrated. The REEV 100 generally comprises an electrified powertrain 108 configured to generate and transfer drive torque to a driveline 112 (axles, wheels, etc.) for vehicle propulsion. As shown, the electrified powertrain 108 comprises a plurality of components generally aligned along a length or longitudinal axis of the REEV 100. Front and rear electric drive modules (EDMs) 116a, 116b are each configured to generate and transfer drive torque to a portion of the driveline 112. For example, the front EDM 116a comprises at least one electric motor 120a configured to generate drive torque that is transferred to the driveline 112 (e.g., a front axle) via an optional respective transmission or gear reducer 124a and the rear EDM 116b comprises at least one other electric motor 120b (collectively, "electric motors 120") configured to generate drive torque that transferred to the driveline 112 (e.g., a rear axle) via another optional respective transmission or gear reducer 124b. In some implementations, one or both of the electric motors 120 are configured to operate as a torque consumer to convert kinetic energy of the REEV 100 into electrical energy as part of a regenerative braking system or feature of the REEV 100 (not specifically shown).

The front and rear EDMs 116a, 116b are powered by electrical energy (i.e., current) provided via a high voltage electrical bus 128, which is connected to a high voltage battery pack or system 132. The electrified powertrain 108 also comprises an internal combustion engine 136 configured to combust a mixture of air and liquid fuel (e.g., gasoline) provided by a fuel system 140 to generate mechanical energy, which drives a generator 144 (e.g., a motor-generator unit, or MGU) to generate electrical energy (i.e., current). In some implementation, an alternating current (AC) output by the generator 144 is converted to a direct current (DC) by a power inverter module (PIM, 148), which is also connected to the high voltage electrical bus 128. The PIM 148 could also be configured to step-up or step-down a voltage at the output of the generator 144 to a desired level. While the electrified powertrain 108 is shown to have an engine 136 as a secondary power source, it will be appreciated that a fuel cell system (e.g., a hydrogen, or H2 fuel cell system) could be implemented as a secondary power source instead of or in addition to the engine 136.

A controller or control system 152 is configured to control operation of the REEV 100. This primarily includes controlling the electrified powertrain 108 to generate a desired amount of drive torque to satisfy a driver torque request (e.g., provided by a driver via an accelerator pedal). The control system 152 is configured to receive measurements of various operating parameters of the REEV from a set of sensors 156. Non-limiting examples of the sensors 156 include a driver interface (accelerator/brake pedals, transmission gear shift lever, start/stop button, inefficiency mode enable/disable button, etc.), powertrain/driveline shaft speed sensors, a navigation/maps system, component temperature/pressure/electrical parameter sensors. Other operating parameters, such battery system state of charge (SOC), could be modeled or estimated based on other parameters rather than directly measured by the sensors 156. The REEV 160 also includes conventional friction brakes 160 that selectively apply frictional braking force to the driveline 112 to decelerate or slow the REEV 100.

Figure 2:
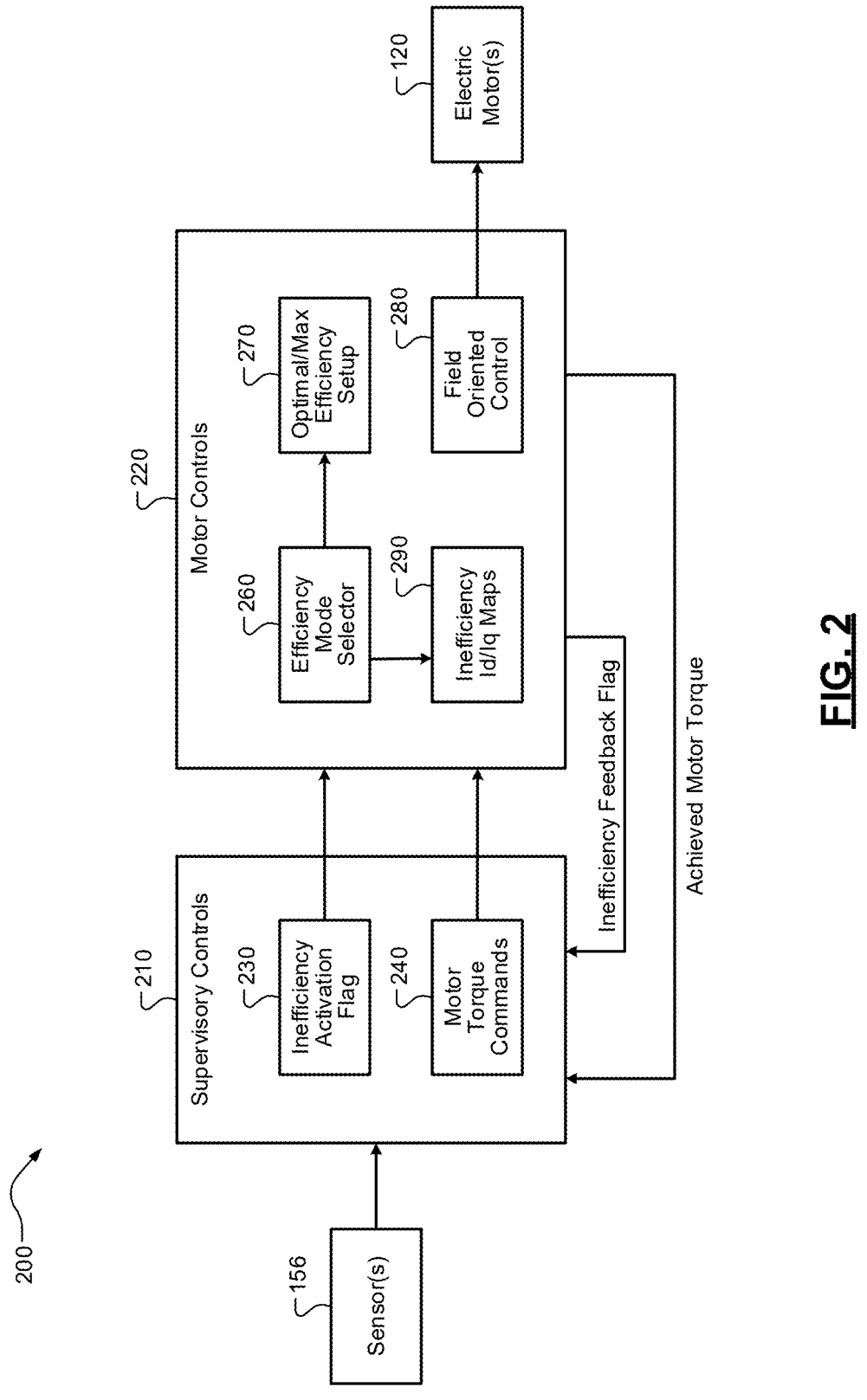
FIG. 2 is a functional block diagram of an example architecture for the energy management system of the REEV of FIG. 1 according to the principles of the present application.

Referring now to FIG. 2 and with continued reference to FIG. 1, a functional block diagram of an example architecture 200 for the energy management system 104 of the REEV 100 of FIG. 1 according to the principles of the present application is illustrated. It will be appreciated that this is merely one example architecture 200 and that other suitable architectures could be utilized. The energy management system 200 generally comprises supervisory controls 210 and motor controls 220, which could be sub-components of the control system 152. In one exemplary implementation, the supervisory controls 210 could be part of a supervisory controller, e.g., a hybrid control processor (HCP) or an electrified vehicle control unit (EVCU), and the motor controls 220 could be part of a motor control processor (MCP). As shown, the energy management system 200 also includes the sensors 156 as inputs and the electric motors 120 as outputs. The supervisory controls 210 include an inefficiency activation flag block 230 and a motor torque commands block 240. The motor torque commands block 240 determines desired motor torque commands based on signals from the sensors 156, such as a driver torque request. In one aspect of the invention, the motor torque commands block 240 is configured to utilize new or updated motor torque Id/Iq commands that are specifically configured or calibrated for the inefficiency mode of operating the electric motors 120.

The inefficiency activation flag block 230 selectively generates an inefficiency activation flag (e.g., an inefficiency mode enable signal) based on whether power dissipation of the battery system 132 is needed. This could also be described as entry/exit conditions for an inefficiency mode (or a power dissipation or "e-burn" mode) of the REEV 100 and are now discussed in greater detail. The inefficiency mode of the REEV 100 could be enabled or disabled based on a variety of different parameters such as road grade, battery SOC, friction brake thermal condition, regenerative braking limitation, and the like. For example, future road grade and other future road parameters (traffic, stop signs, etc.) could be determined using the navigation/maps system of sensors 156. In some cases, negative torque requests could be accounted for, such as a brake torque request, the driver torque request (or driver-intended torque), and a zero pedal request (e.g., an accelerator pedal not depressed, which could involve cruise control operation or the vehicle decelerating or coasting-down). Weight variation (i.e., different loadings and different vehicle size/weight trailers) could be a significant parameter in the techniques of the present application. Accordingly, the inefficiency mode enable conditions could vary significantly with various vehicle weights, slope grade, battery SOC and the like.

Enabling the inefficiency mode too early causes wasted energy and efficiency losses, while enabling the inefficiency mode too late enable can impact drivability performance and customer satisfaction. Additionally, frequent enable and disable of the inefficiency mode (i.e., a poor enable strategy) reduces hardware life and causes noise/vibration/harshness (NVH) and drivability issues. The present application develops an enable strategy to achieve an optimized amount of power/energy dissipation and stable/smooth inefficiency mode operations. Additionally or alternatively, the inefficiency mode could be manually enabled by a driver of the REEV 100, such as using an inefficiency mode manual control (a switch/button, a user-interface selectable option, etc.). For example, this could allow the driver of the REEV 100 to operate the inefficiency mode similar to an exhaust brake on a conventional diesel vehicle, which could be particularly useful or desirable for drivers having past experience with such vehicles/features. Additional inputs, such as vehicle weight, electrified powertrain drive mode (EV-only, engine only, hybrid, etc.), and downhill time are used for the inefficiency mode enable strategy optimization by the inefficiency activation flag block 230. The efficiency mode selector 260 receives the inefficiency mode enable signal or flag from the inefficiency activation flag block 230 when it is generated by the same.

Based on whether this signal or flag is received, the efficiency mode selector 260 enables one of two modules: (i) an optimal/maximum efficiency setup 270, which is a conventional routine for generating maximum or optimal torque commands for the electric motors 120, or (ii) inefficiency Id/Iq maps 290. Each of these modules or blocks 270, 290 outputs motor torque commands Id/Iq, which are used by a field oriented control block 280 to generate final commands (e.g., three-phase current commands for windings of the electric motors 120). The inefficiency Id/Iq maps 290 represent a new or unique part of the motor controls 220 as part of the techniques of the present disclosure. When the inefficiency mode enable signal or flag is generated by block 230, the inefficiency Id/Iq maps 290 determine Id and Iq motor torque commands based on the output of block 240. The inefficiency Id/Iq maps 290 are specifically determined for this inefficiency mode and are completely separate from the conventional setup 270. In other words, the inefficiency Id/Iq maps 290 are configured to output one or more different sets of Id/Iq motor torque commands that achieve a same desired torque output of the electric motors 120 while consuming more energy due to the inefficient operation.

The motor controls 220 are also configured to respond with an inefficiency feedback flag or a similar confirmation signal, which is received by the supervisory controls 210. When this flag/signal is received, the supervisory controls 210 adjust their controls to utilize new or updated motor loss maps that are configured or calibrated based on the inefficiency mode and the corresponding motor torque Id/Iq commands being utilized by the motor controls 220. The use of these new/updated motor loss maps by the supervisory controls 210 allows for increased regen control (i.e., increased regenerative braking or similar energy capture or regeneration), thereby increasing the amount of energy that is capable of recovering and storing in the vehicle battery system.

Figure 3:
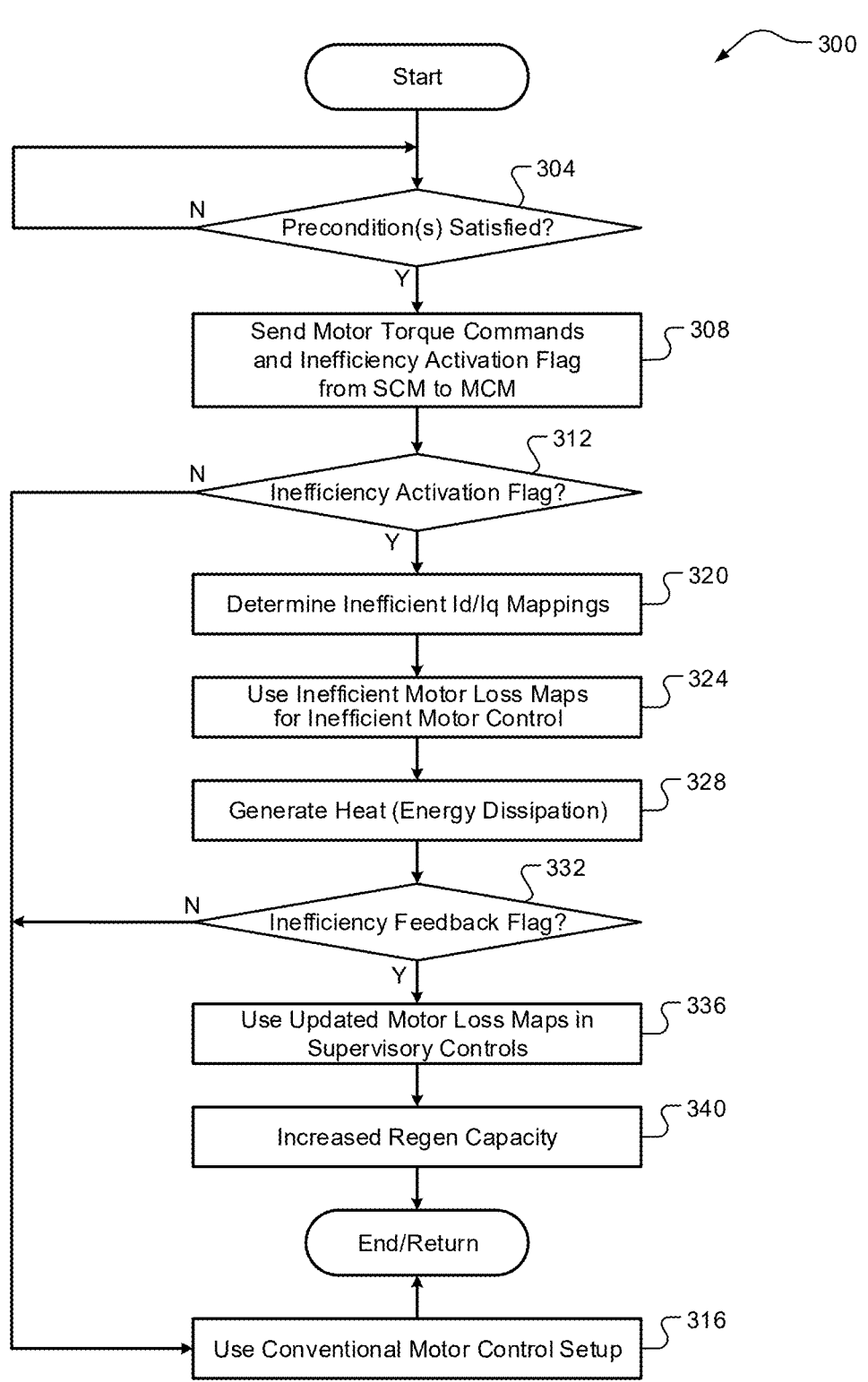
FIG. 3 is a flow diagrams of an example energy management method for an REEV that involves operating electric motor(s) inefficiently according to the principles of the present application.

Referring now to FIG. 3, a flow diagram of an example energy management method 300 for an REEV that involves operating electric motor(s) inefficiently according to the principles of the present application is illustrated. While the REEV 100 and its components are specifically referenced for illustrative/descriptive purposes, it will be appreciated that the method 300 could be applicable to any suitably configured REEV. The method 300 begins at 304 where the control system 152 determines whether a set of one or more optional preconditions are satisfied. These precondition(s) could include, for example only, the REEV 100 being powered up and in a drive-ready mode and there being no malfunctions or faults present that would otherwise inhibit or negatively impact the operation of the techniques of the present application. In some implementations, this step 304 could also involve determining whether a derate factor is less than one. This derate factor represents a desired degree of inefficiency (e.g., zero inefficiency or maximum efficiency equals one) for intentionally dissipating energy from the battery system 132. When false, the method 300 ends or returns to 304. When true, the method 300 proceeds to 308. At 308, the motor torque commands (based on the driver torque request) and the inefficiency activation flag are sent from the supervisory controls or supervisory control module 210 (SCM) to the motor controls or motor control module 220 (MCM). At 312, the motor controls 220 determine whether the inefficiency activation flag was received. When false, the method 300 proceeds to 316. When true, the method proceeds to 320.

At 316, the control system 152 performs motor control in the conventional maximized or optimized manner (e.g., an existing motor control setup) and the method 300 then ends or returns to 304. At 320, the control system 152 determines the new/updated motor torque Id/Iq commands (e.g., using inefficiency Id/Iq maps 290) and, at 324, the control system 152 applies the new Id/Iq mappings for the inefficient motor operation (e.g., via block 270 in motor controls 220). At 328, the inefficient operation of the electric motors 120 is performed (e.g., by generating three-phase currents for the windings of the electric motors 120), which results in heat generation and energy dissipation due to the inefficient operation. At 332, the supervisory controls 210 determine whether an inefficiency feedback flag has been received from the motor controls 220. When false, the method 200 proceeds to 316. When true, the method 300 proceeds to 336. At 336, the control system 152 uses the updated motor loss maps for inefficient motor operation (e.g., via block 240 in supervisory controls 210). At 340, this control using the new/updated motor loss maps by the supervisory controls 210 increases the regenerative energy capacity for subsequent energy storage and avoidance of friction brake usage. The method 300 then ends or returns to 304 for one or more additional cycles.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An energy management system for a range-extended electrified vehicle (REEV), the energy management system comprising:
    a set of sensors configured to monitor a set of operating parameters of the REEV, the set of operating parameters being indicative of (i) a driver torque request and (ii) whether to enable an inefficiency mode for operating an electric motor of the REEV; and
    a control system configured to:
        determine whether to enable the inefficiency mode for operating the electric motor of the REEV based on the set of operating parameters; and
        in response to enablement of the inefficiency mode:
            utilize inefficient motor loss maps specifically for the inefficiency mode and separate from maximum efficiency motor loss maps;
            determine motor torque commands for the electric motor using the driver torque request, the inefficient motor loss maps, and inefficient motor torque command mappings specifically for the inefficiency mode and separate from maximum efficiency motor torque command mappings; and
            control the electric motor using the determined motor torque commands to generate heat energy and dissipate energy from a battery system configured to power the electric motor and thereby create space for storage of energy captured by a regenerative braking system of the REEV.

2. The energy management system of claim 1, wherein the inefficient motor torque commands cause the electric motor to generate a desired amount of drive torque to satisfy the driver torque request at a decreased efficiency.

3. The energy management system of claim 2, wherein the inefficient motor torque commands are one of a plurality of different inefficient motor torque commands that each cause the electric motor to generate the desired amount of drive torque to satisfy the driver torque request at the same decreased efficiency or at different decreased efficiencies.

4. The energy management system of claim 1, wherein the set of operating parameters includes at least one of (i) road grade, (ii) state of charge (SOC) of the battery system, and (iii) temperature of a friction brake system of the REEV.

5. The energy management system of claim 4, wherein the set of operating parameters includes at least (i) the road grade, (ii) SOC of the battery system, and (iii) the temperature of the friction brake system.

6. The energy management system of claim 1, wherein the set of operating parameters includes road parameters of a future road segment that the REEV will encounter such that the control system is configured to enable the inefficiency mode for operating the electric motor proactively before the road segment is reached.

7. The energy management system of claim 1, wherein the set of operating parameters includes an operating parameter of a friction brake system of the REEV, and wherein the inefficiency mode is configured to intentionally dissipate energy from the battery system to reduce a load on the friction brake system.

8. The energy management system of claim 1, wherein the REEV includes the electric motor and at least one additional electric motor, and wherein the inefficiency mode is for operating at least one of the two or more electric motors.

9. The energy management system of claim 8, wherein the REEV includes the electric motor and the engine associated with a front axle of the REEV and the at least one additional electric motor associated with a rear axle of the REEV.

10. An energy management method for a range-extended electrified vehicle (REEV), the energy management method comprising:

receiving, by a control system of the REEV and from a set of sensors of the REEV, a set of operating parameters of the REEV, the set of operating parameters being indicative of (i) a driver torque request and (ii) whether to enable an inefficiency mode for operating an electric motor of the REEV;

determining, by the control system, whether to enable the inefficiency mode for operating the electric motor of the REEV based on the set of operating parameters; and in response to enablement of the inefficiency mode:

utilizing, by the control system, inefficient motor loss maps specifically for the inefficiency mode and separate from maximum efficiency motor loss maps;

determining, by the control system, motor torque commands for the electric motor using the driver torque request, the inefficient motor loss maps, and inefficient motor torque command mappings specifically for the inefficiency mode and separate from maximum efficiency motor torque command mappings; and controlling, by the control system, the electric motor using the determined motor torque commands to generate heat energy and dissipate energy from a battery system configured to power the electric motor and thereby create space for storage of energy captured by a regenerative braking system of the REEV.

11. The energy management method of claim 10, wherein the inefficient motor torque commands cause the electric motor to generate a desired amount of drive torque to satisfy the driver torque request at a decreased efficiency.

12. The energy management method of claim 11, wherein the inefficient motor torque commands are one of a plurality of different inefficient motor torque commands that each cause the electric motor to generate the desired amount of drive torque to satisfy the driver torque request at the same decreased efficiency or at different decreased efficiencies.

13. The energy management method of claim 10, wherein the set of operating parameters includes at least one of (i) road grade, (ii) state of charge (SOC) of the battery system, and (iii) temperature of a friction brake system of the REEV.

14. The energy management method of claim 13, wherein the set of operating parameters includes at least (i) the road grade, (ii) SOC of the battery system, and (iii) the temperature of the friction brake system.

15. The energy management method of claim 10, wherein the set of operating parameters includes road parameters of a future road segment that the REEV will encounter such that the control system is configured to enable the inefficiency mode for operating the electric motor proactively before the road segment is reached.

16. The energy management method of claim 10, wherein the set of operating parameters includes an operating parameter of a friction brake system of the REEV, and wherein the inefficiency mode is configured to intentionally dissipate energy from the battery system to reduce a load on the friction brake system.

17. The energy management method of claim 10, wherein the REEV includes the electric motor and at least one additional electric motor, and wherein the inefficiency mode is for operating at least one of the two or more electric motors.

18. The energy management method of claim 17, wherein the REEV includes the electric motor and the engine associated with a front axle of the REEV and the at least one additional electric motor associated with a rear axle of the REEV.

* * * * *